United States Patent [19]
Dute

[11] Patent Number: 5,729,547
[45] Date of Patent: Mar. 17, 1998

[54] AUTOMATIC DRIVER/RECEIVER CONTROL FOR HALF-DUPLEX SERIAL NETWORKS

[75] Inventor: John C. Dute, Concord, Mich.

[73] Assignee: Dutec, Inc., Jackson, Mich.

[21] Appl. No.: 597,939

[22] Filed: Feb. 7, 1996

[51] Int. Cl.⁶ ..................... H04B 1/38
[52] U.S. Cl. ..................... 370/447; 375/219
[58] Field of Search ..................... 370/282, 276, 370/278, 445, 447, 437; 340/825.5, 825.51; 375/219, 220, 257; 178/71.1, 71.9; 455/528, 79; 371/59

[56] References Cited

U.S. PATENT DOCUMENTS

| | | |
|---|---|---|
| 3,796,992 | 3/1974 | Nakamura et al. ......... 370/447 |
| 3,919,461 | 11/1975 | Hunting et al. . |
| 4,186,379 | 1/1980 | Knoblock et al. . |
| 4,320,452 | 3/1982 | Kempf et al. . |
| 4,337,465 | 6/1982 | Spracklen et al. . |
| 4,528,465 | 7/1985 | Harvey . |
| 4,613,858 | 9/1986 | Davidson et al. ......... 370/445 |
| 4,685,113 | 8/1987 | Hano et al. . |
| 4,719,458 | 1/1988 | Miesterfeld et al. ......... 370/447 |
| 4,785,465 | 11/1988 | Lang et al. ......... 375/219 |
| 4,807,223 | 2/1989 | Wells . |
| 4,841,295 | 6/1989 | Delaney et al. . |
| 4,941,126 | 7/1990 | Hauburgin . |
| 5,065,153 | 11/1991 | Tomita et al. . |
| 5,237,322 | 8/1993 | Heberle . |
| 5,325,355 | 6/1994 | Oprescu et al. . |
| 5,499,269 | 3/1996 | Yoshino ......... 375/219 |

*Primary Examiner*—Chau Nguyen
*Attorney, Agent, or Firm*—Young & Basile, P. C.

[57] ABSTRACT

A driver control enable and disable circuit for an asynchronous serial local area data distribution system including a plurality of distributed data processing stations connected to a common bus and utilizing a half-duplex signaling protocol which prevents contention between messages originating from different stations. In order to assure message integrity, only the transmitter of the protocol allowed message is enabled. The signals which control the enabling of this transmitter cause reset of the driver of the previously allowed message on the bus by monitoring the driver current.

7 Claims, 2 Drawing Sheets

AUTOMATIC DRIVER/RECEIVER CONTROL FOR HALF-DUPLEX SERIAL NETWORKS

FIELD OF INVENTION

This invention relates to the control of driver/receivers in asynchronous serial local area data distribution network systems operating on a common bus and utilizing half-duplex signaling protocols that prevent contention between messages.

BACKGROUND OF THE INVENTION

Serial communications is the means most often used for data interchange between personal computers and remotely located devices. Frequently such communications between computers and remote data devices must be bidirectional. For short distances the simplest way to accomplish this is to provide two independent, bidirectional communications circuits or links. Such bidirectional links are known as full-duplex links. As distance and the number of data stations on a network increases, the cost of full-duplex links can become excessive.

A more economical method is to utilize a single circuit capable of bidirectional traffic, but use it only one way at a time. Such circuits are called half-duplex circuits or links. In half-duplex communication, bidirectional transmission can be conducted, but only in one direction at a time. Signaling protocols are available that only allow only a single driver to be active or enabled at any given time thus ensuring that communications can be conducted without any message contention.

To utilize such signaling protocols it is necessary that any individual driver be enabled only during the time it is actually transmitting a message and be disabled while receiving a message.

Hardware and software means are available to control individual driver enable signals of driver/receivers operating on half-duplex asynchronous serial communications networks in accordance with the specifications of various anti-contention signaling protocols.

With a software approach, in order to convert the parallel data from a computer format to the serial form needed by the communications link, a component commonly called a UART for Universal Asynchronous Receiver Transmitter is utilized. A secondary function provided by some UARTs is an output line commonly called the Request To Send or "RTS", which can, under software control, provide the enable signal which activates the serial driver.

A shortcoming of the software approach occurs when programmers either neglect the repetitive task of adding instructions before and after the transmission of each character or, who do not appreciate or understand the need for such software in half-duplex communications circuits. The result of the lack of these instructions is that reliable bidirectional data traffic cannot be achieved without time consuming system debugging.

Data to be transmitted serially over a network is assembled, for example, in a (UART) like device producing characters each of which contain a START bit, followed, typically, by eight DATA bits, and ending with one STOP bit. The START and STOP bits in effect synchronize each character thus giving rise to the asynchronous capability of this type of serial communications. The electrical signals representing these bits are as follows. During the idle period preceding the transmission of the START bit, the electrical signal is in a current producing condition, a convention that makes it possible to determine if the circuit is complete. This is called the MARK state. Thus the START bit always drops from its high, or idle MARK state, to its low state, or SPACE state. Individual DATA bits are high or low depending on the character being transmitted, and the STOP bit is always high or in a MARK state, where it remains in a subsequent idle period until the next character is transmitted. The time duration of each bit is called its Baud period.

In a conventional hardware approach, the high-to-low voltage change of the START bit SETS a set-reset latch whose output enables the driver.

The resetting of the set-reset latch when the character transmission is complete is not as simple because the character time duration is a function of both the number of data bits included in the character and the Baud rate at which the data is being transmitted. Low cost resistor-capacitor timing circuits are frequently used to generate the reset input for the set-reset latch when high timing precision is not required. These circuits suffer the inconvenience of having to provide means for changing component values in order to accommodate different message lengths or Baud rates.

When more precise timing is required in order to maximize data transmission rates, timing circuits using counters can be utilized. Provisions also have to be made to take into account the number of data bits and the Baud rate being used. Relatively expensive micro-processor based systems can be used to automatically generate time delays that take into account both the data bit count and different Baud rates.

Thus, it would be desirable to provide a means for controlling a driver in a data network which overcomes the deficiencies in previously devised driver control circuits utilizing software or hardware to enable and disable the driver. It would also be desirable to provide a driver control means which automatically resets a driver to avoid contention on the network.

SUMMARY OF THE INVENTION

The present invention is an apparatus for controlling data communication in a half-duplex serial network. The apparatus comprises a plurality of independent data driver means for driving data signals to be transferred, a plurality of independent receiver means for receiving data signals transferred from one data driver means, signal communication means shared by the plurality of data driver means and the plurality of receiver means for communicating data between one of the plurality of data driver means and one of the plurality of receiver means, and means, associated with at least two of the plurality of data driver means, for detecting the start of data transmission on the signal communication means from another one of the data driver means and for resetting the last to transmit data driver means from a data transmitting state.

At least two of the data driver means includes latch means, connected to an enable input of the data driver means, for latching the state of a data driver enable signal in one of two opposed logic states, the first state enabling data transmission by the data driver means and the second state disabling data transmission by the data driver means. The latch means latches the enable input in an enabling state when start of data transmission on the communication means is detected.

The resetting means comprises means for detecting an electrical current drawn by the last to transmit data driver means which exceeds a reference current typically associated with normal data transmissions when another data driver means begins transmitting data on the signal communication means, the detecting means supplying a signal to the latch means to reset the latch means to disable the last to transmit data driver means. In an exemplary embodiment, the current detecting means includes comparator means having a reference voltage input and another input corresponding to a voltage drop resulting from the current drawn by the data driver means.

The present invention provides a simple, low cost automatic driver/receiver control for half-duplex serial networks which requires no software instructions to enable and disable the driver at the beginning and the end of a transmitted character, and which also operates independently of the character length and Baud rates, thus overcoming the disadvantages previously described for prior art driver control circuits.

The last bit of a character, the STOP bit, leaves the still active driver of the last to transmit data station in the idle or MARK state. When the driver of a second data station of the network begins its transmission with a low going START bit, or SPACE, as allowed by the signaling protocol, the supply current for the last to transmit driver current increases. This current is sensed by the current detecting means of the last to transmit driver. When the sensed current of the last to transmit driver becomes greater than a reference current associated with normal data transmitting, the output of a comparator changes its output state from high to low which in turn resets the set-reset latch resulting in disabling of the last to transmit driver. This action takes place so quickly, that only a negligible time portion of the start bit from the data of the second data station driver is lost.

BRIEF DESCRIPTION OF DRAWINGS

The various features, advantages and other uses of the present invention will become more apparent by referring to the following detailed description and drawing in which.

DESCRIPTION OF THE PREFERRED EMBODIMENTS

Figure 1:
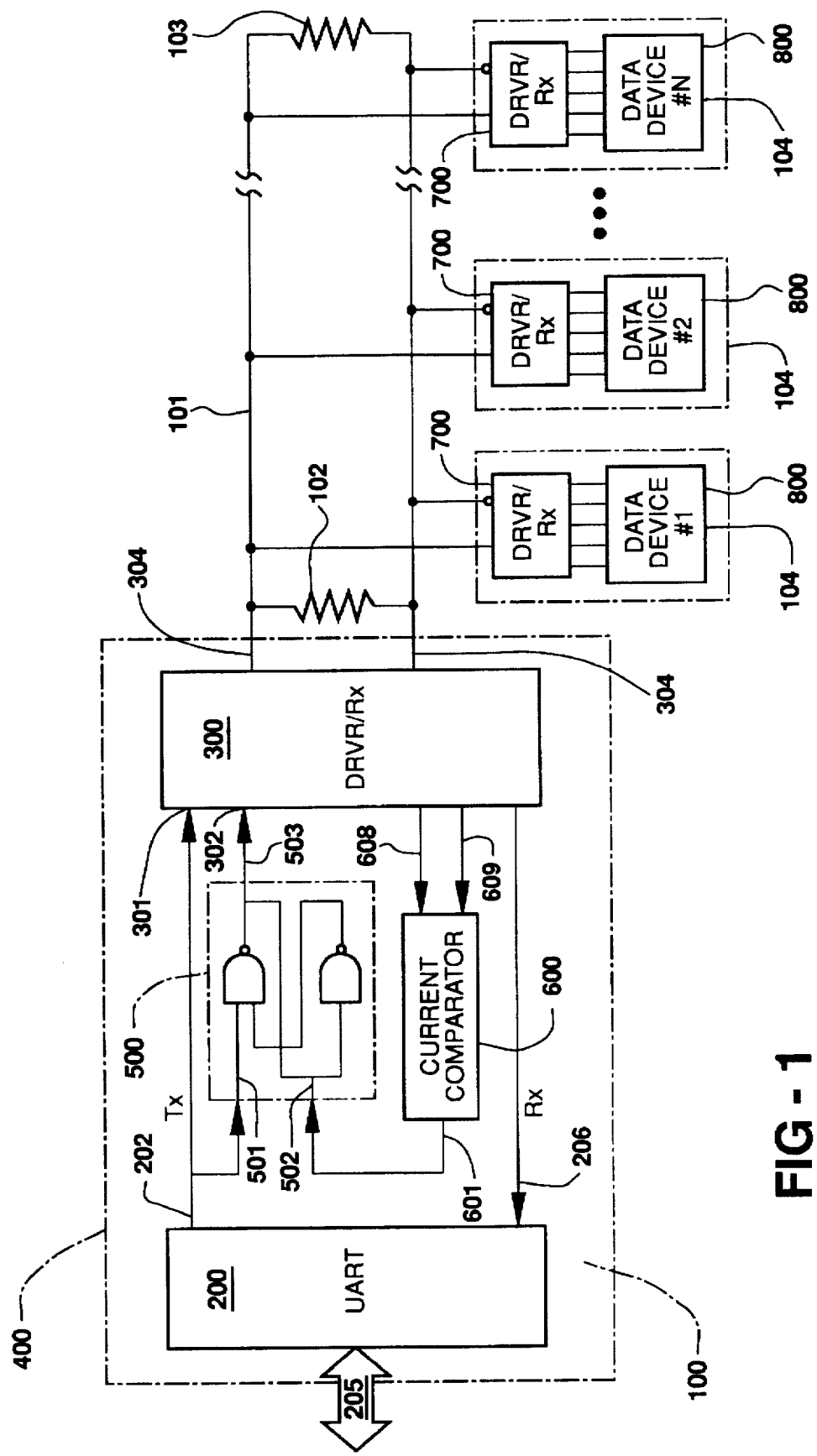
FIG. 1 is a block schematic of a data-to-bus termination Interface unit and its associated data distribution bus including bus driver/receivers and associated data stations connected thereto utilizing the present invention.

Serial data networks generally include a plurality of data stations or units, each including a data processing device, such as a computer, printer, monitor, etc. In an exemplary application of the present invention, a serial network includes a plurality of data stations, such as a data-to-bus termination Interface unit 100, a data distribution bus 101 of a local distribution network, and associated data stations 104 is shown in FIG. 1. The data distribution bus 101 is intended to transmit data bidirectionally from any one of a plurality of data stations 104 connected to the bus 101 to the data-to-bus termination interface unit 100. Each of the plurality of data stations 104 are coupled to the bus 101. These data stations 104 (three are shown by example only) may be distributed along the length of the bus 101, but need not be distributed in any structured dimensional configuration. The data distribution bus 101 may be any wire pair consistent with the capabilities of individual driver/receivers 300 of the data-to-bus termination interface unit 100 and the driver/receivers 700 of the various distributed data stations 104. By example only, such driver/receivers 300 and 700 may be a driver/receiver manufactured by Maximum as model no. 485CPA.

The far end of the bus 101 is terminated in a resistive termination impedance 103 equal to the resistive characteristic transmission impedance of the bus 101. The near end of the bus 101 is terminated in a resistive termination impedance 102 equal to the resistive characteristic transmission impedance of the bus 101.

The near end of bus 101 is connected to the data driver/receiver 300, which is part of the data-bus termination interface unit 100. The enabling of the driver of this driver/receiver 300 is determined by an output 503 of a driver/receiver control latch 500 which is part of an automatic driver/receiver control 400 of the present invention.

Figure 2:
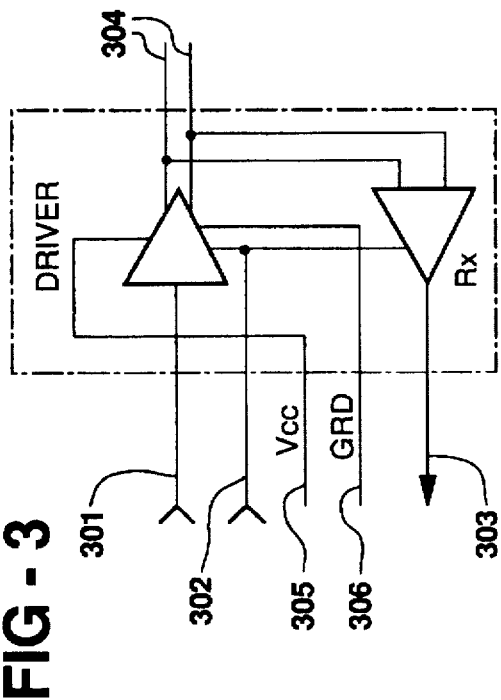
FIG. 2 is a bit sequence diagram for a typical data character received from the serial data output of the UART shown in FIG. 1.

When the UART (universal asynchronous receiver transmitter) 200 of the data-to-bus termination interface unit receives parallel data from a parallel data source 205, a serial character is outputted from its T×D (transmitted data) output 202. The serial bits of the character to be transmitted 201 are shown in FIG. 2. The first bit of the output 202 drops from a logic or voltage high of a MARK to a low voltage low of a SPACE.

Figure 3:
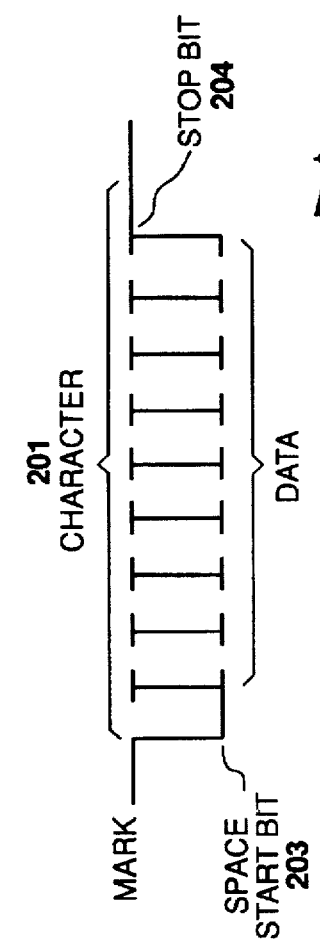
FIG. 3 is a schematic diagram of the driver/receiver and its associated data input and outputs, driver enable and power supply inputs shown in general in FIG. 1.

The output signal 202 is simultaneously applied to a SET input 501 of the driver/receiver control latch 500 shown in FIG. 1 and to a driver/receiver transmitter data input 301 of the driver/receiver 300 shown in FIGS. 1 and 3. At least two of the driver/receivers utilize the latch 500. Other drivers on the bus 101 can use other enable/disable means as long as such means provides the same function as the latch 500.

An output 503 of the driver/receiver control latch 500 shown in FIG. 1, has a state listed by the following truth table for a set-reset latch constructed with NAND gates.

| Set (501) | Reset (502) | Output (503) |
| --- | --- | --- |
| 1 | 1 | previous state |
| 0 | 1 | 1 |
| 1 | 0 | 0 |
| 0 | 0 | 1 |

The output 503 is high when its SET input 501 is low. Because the set-reset latch is constructed from NAND gates it is also to be noted from the truth table that while the SET input 501 of driver/receiver control latch 500 is low the output 503 is high regardless of the value of the reset input 502 to the driver/receiver control latch 500.

The output 503 of the driver/receiver control latch 500 is applied to the enable input 302 of the driver/receiver 300 shown in FIG. 3. As long as the enable input 302 of the driver/receiver 300 remains in a high state, the driver portion of the driver/receiver 300 is activated in such a manner that data applied to the data input 301 of the driver/receiver 300 will be transmitted from the output 304 to the data distribution bus 101.

By convention, the last or STOP bit 204 of the serial bit stream of each character 201 from the output 202 of the UART 200 to be transmitted, as shown in FIG. 2, is always the MARK or logic 1.

Following the transmission of the STOP bit 204 by the driver/receiver 300 shown in FIG. 3, the enable input 302 of the driver/receiver 300 which resulted from the output 503 of the driver/receiver control latch will remain high or at a logic 1. This state will continue so long as the reset input 502 of the set-reset latch 500 remains high as indicated in the truth table.

A conventional system-wide signaling communications protocol, which is not part of this invention, and which will not be described herein, prevents message contention on the data distribution network 101.

When the signaling protocol permits a selected distributed data station 104 to begin to transmit a message, its data source 800 enables its driver/receiver 700 and initiates the transmission of a START bit 203 similar to those originating from the UART of FIG. 2. This low going START bit 203 shown in FIG. 2 is applied to the data network 101. At this instant in time, the driver of previously transmitting driver/receiver 300 which was left in a high state attempts to drive the data network 101 in the opposite direction from the new driver 700. As a result, the supply current drawn by the driver 300 increases to a value greater than that which occurs during normal transmission.

Figure 4B:
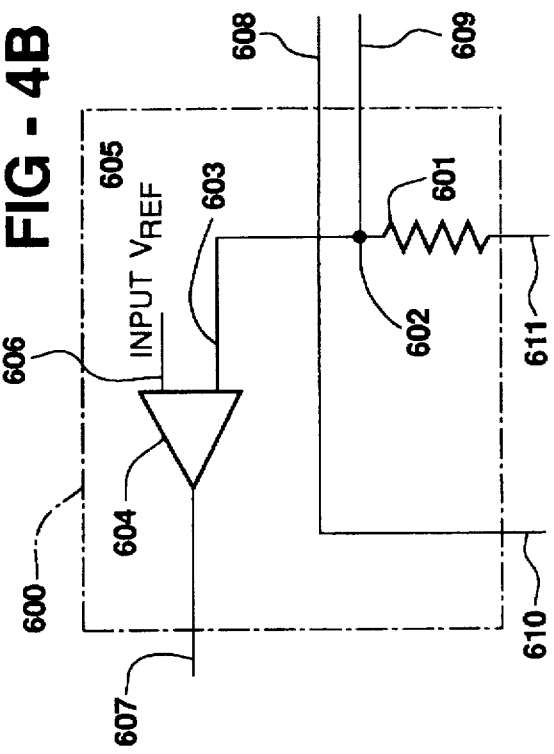
FIGS. 4A and 4B are schematic diagrams of two alternative arrangements of a current comparator shown generally in FIG. 1.
Figure 4A:
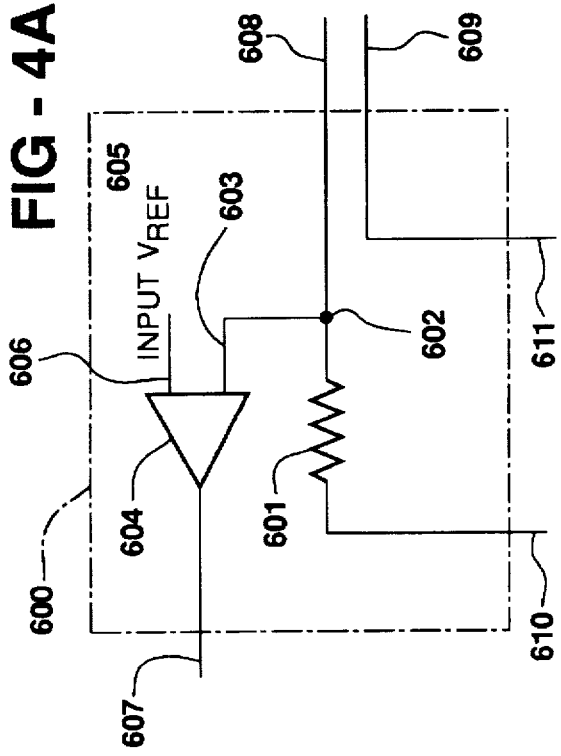

The path of the current supplying the driver 300 originates as a supply positive voltage source 510 shown in FIGS. 4A and 4B flowing through a sensing resistor 601 and leaves a current comparator 600 via line 608 to driver Vcc lead 305 of the driver/receiver 300 shown in FIG. 3. The return current path leaves the driver/receiver 300 via driver ground 306 and enters the current comparator 600 via line 609 and finally to supply ground 611.

FIG. 4A depicts current sensing on the high side of the power supply in which the supply current for the driver 300 flowing through the sensing resistor 601 is detected at point 602. The sensed voltage at point 602 and a reference voltage 605 from a suitable source, such as a voltage divider, for example, are applied to inputs 603 and 606 respectively of the comparator 604 in such a manner that the comparator output 607 will change from a logic high to a logic low when the driver 300 supply current, as determined by the voltage at point 682, exceeds a preset reference voltage 605.

Similarly, FIG. 4B shows the sensing of current in the ground side of a power supply. The output 607 of comparator 604 is connected to the reset input 502 of the driver/receiver control latch 500 shown in FIG. 1.

It should be noted that at the completion of the transmission of the last character by driver 300, the STOP bit 204, that was also applied to set input 501 of the driver/receiver control latch 500, was left in a high state or as a logic 1. The truth table indicates the output 503 of the driver/receiver control latch 500 will change to a low state or a logic 0, thus disabling the output of the driver of the driver/receiver 300. This causes the driver 300 supply current as sensed by resistor 601 of the current comparator 600 to return to a value low enough to that when compared with reference voltage 605 to return the comparator output 607 to a MARK high state or logic 1. Referring to the truth table for the condition when both the set SOL and reset 502 inputs are high or logic 1s, it is seen that the output of the driver/receiver control latch 500 will remain in its last state which was low or a logic 0. Thus the driver of the driver/receiver 300 will continue to be disabled until the next low going START bit 203 is received from the output 202 of the UART 200.

It should be noted that the current comparator 600 and the set-reset latch 500 can be employed in any of the data stations 104 where the signaling protocol allows data transmission to another station 104 rather than just to the data-to-bus interface 400.

What is claimed is:

1. An apparatus for controlling a data communication data driver in a half-duplex serial network, wherein signals are transmitted in series formed of a first logic low start bit, a plurality of data bits, and a last logic high stop bit, the apparatus comprising:

at least first and second independent data driver means for driving data signals to be transferred, each having an enable input capable of two opposed logic states, the first state enabling data transmission by the respective first and second data driver means, and the second state disabling data transmission by the respective first and second data driver means;

first and second latch means, connected to the enable input of the first and second data driver means, respectively, for latching the state of a data driver means enable signal in one of two opposed logic states, the first and second latch means supplying the data driver means enable signal to the enable input of the first and second data drivers means, respectively, and maintaining the respective enable input in an enabling state when a start bit of data transmission is detected;

first and second receiver means, associated with the first and second data driver means, respectively, for receiving data signals transferred from one other of the first and second data driver means;

signal communication means shared by the first and second data driver means and the first and second receiver means for communicating data between one of the first and second data driver means and one of the first and second receiver means; and means, associated with the first and second data driver means, for detecting a start of data transmission on the signal communication means from the other of the first and second data driver means and for resetting to a second state the first and second latch means connected to another of the first and second data driver means which was the last data driver means to transmit signals on the signal communication means.

2. The apparatus of claim 1 wherein the detecting means further comprises:

means for detecting a transmission of a START bit from one of the plurality of data driver means.

3. The apparatus of claim 1 wherein the detecting and resetting means comprises:

means for detecting an electrical current drawn by the last to transmit data driver means which exceeds a reference current when another data driver means begins transmitting data on the signal communication means, the detecting means supplying a signal to the latch means to reset the latch means to disable the last to transmit data driver means.

4. The apparatus of claim 3 wherein the electrical current detecting means comprises:

comparator means having a reference voltage input and another input corresponding to a voltage drop related to the current drawn by the last to transmit data driver means.

5. The apparatus of claim 1 wherein each of the first and second latch means comprises:

a flip-flop having a set input, a reset input and an output connected to the enable input of a data driver means.

6. The apparatus of claim 5 wherein:

the flip-flop is formed of NAND gates.

7. The apparatus of claim 1 further comprising:

a plurality of data stations, each including one data driver means, one receiver means, one data source for generating serial data, and a data unit for receiving serial data.

* * * * *